(12) United States Patent
Wallén

(10) Patent No.: US 8,934,521 B2
(45) Date of Patent: Jan. 13, 2015

(54) COMPENSATING FOR RECEIVER FREQUENCY ERROR IN NOISE ESTIMATION PROCESSING

(71) Applicant: Telefonaktiebolaget L M Ericsson (publ), Stockholm (SE)

(72) Inventor: Anders Wallén, Ystad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/927,199

(22) Filed: Jun. 26, 2013

(65) Prior Publication Data

US 2013/0287066 A1 Oct. 31, 2013

Related U.S. Application Data

(63) Continuation of application No. 10/991,878, filed on Nov. 18, 2004, now abandoned.

(60) Provisional application No. 60/580,202, filed on Jun. 16, 2004.

(51) Int. Cl.
*H04B 1/00* (2006.01)

(52) U.S. Cl.
USPC ........... 375/148; 375/350; 375/142; 375/150; 375/243

(58) Field of Classification Search
USPC .......................................................... 375/148
See application file for complete search history.

(56) References Cited

U.S. PATENT DOCUMENTS

| | | | |
|---|---|---|---|
| 4,477,912 A * | 10/1984 | Russell | 375/367 |
| 5,239,591 A * | 8/1993 | Ranganath | 382/128 |
| 5,490,165 A * | 2/1996 | Blakeney et al. | 370/335 |
| 6,097,608 A | 8/2000 | Berberich et al. | |
| 6,097,770 A | 8/2000 | Bahai et al. | |
| 6,356,608 B1 | 3/2002 | Atarius | |
| 6,470,047 B1 * | 10/2002 | Kleinerman et al. | 375/232 |
| 6,563,885 B1 * | 5/2003 | Magee et al. | 375/316 |
| 6,714,585 B1 * | 3/2004 | Wang et al. | 375/148 |
| 6,765,969 B1 | 7/2004 | Vook et al. | |
| 6,807,242 B1 * | 10/2004 | Mutoh | 375/343 |
| 6,889,154 B2 | 5/2005 | Ashley et al. | |
| 7,257,377 B2 * | 8/2007 | Malladi et al. | 455/65 |
| 7,352,798 B2 | 4/2008 | Oura et al. | |
| 7,408,894 B2 * | 8/2008 | Kim et al. | 370/318 |
| 2005/0069023 A1 * | 3/2005 | Bottomley et al. | 375/148 |

FOREIGN PATENT DOCUMENTS

| | | |
|---|---|---|
| JP | 09200081 A | 7/1997 |
| JP | 2004015777 A | 1/2004 |

* cited by examiner

*Primary Examiner* — Lihong Yu
(74) *Attorney, Agent, or Firm* — Murphy, Bilak & Homiller, PLLC

(57) ABSTRACT

A receiver circuit provides improved noise estimation processing by at least partially removing receiver frequency error bias. An initial noise estimate is compensated using an error term based on the observed receiver frequency error, and the resulting compensated noise estimate can be used to improve other signal processing in the receiver. For example, the receiver may use compensated noise estimates to generate signal quality estimates, e.g., Signal-to-Interference (SIR) estimates, having improved accuracy. Additionally, or alternatively, the receiver may use the compensated noise estimates to generate RAKE combining weights having improved noise suppression characteristics. In an exemplary embodiment, the initial noise estimate is a noise correlation matrix generated from a received reference signal, e.g., pilot symbols, and the error term is an error matrix directly generated using the observed receiver frequency error and channel estimates taken from the reference signal.

35 Claims, 2 Drawing Sheets

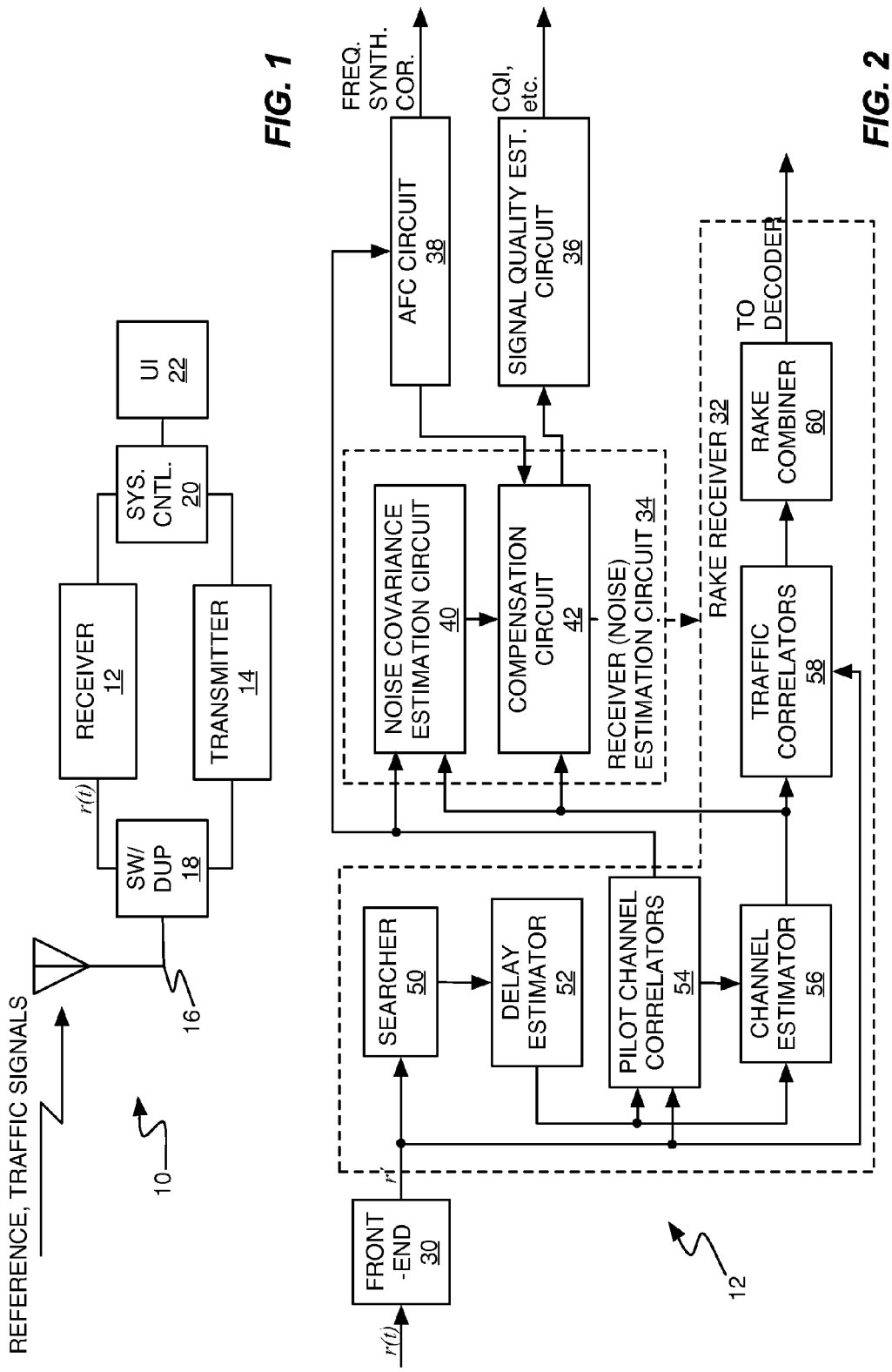

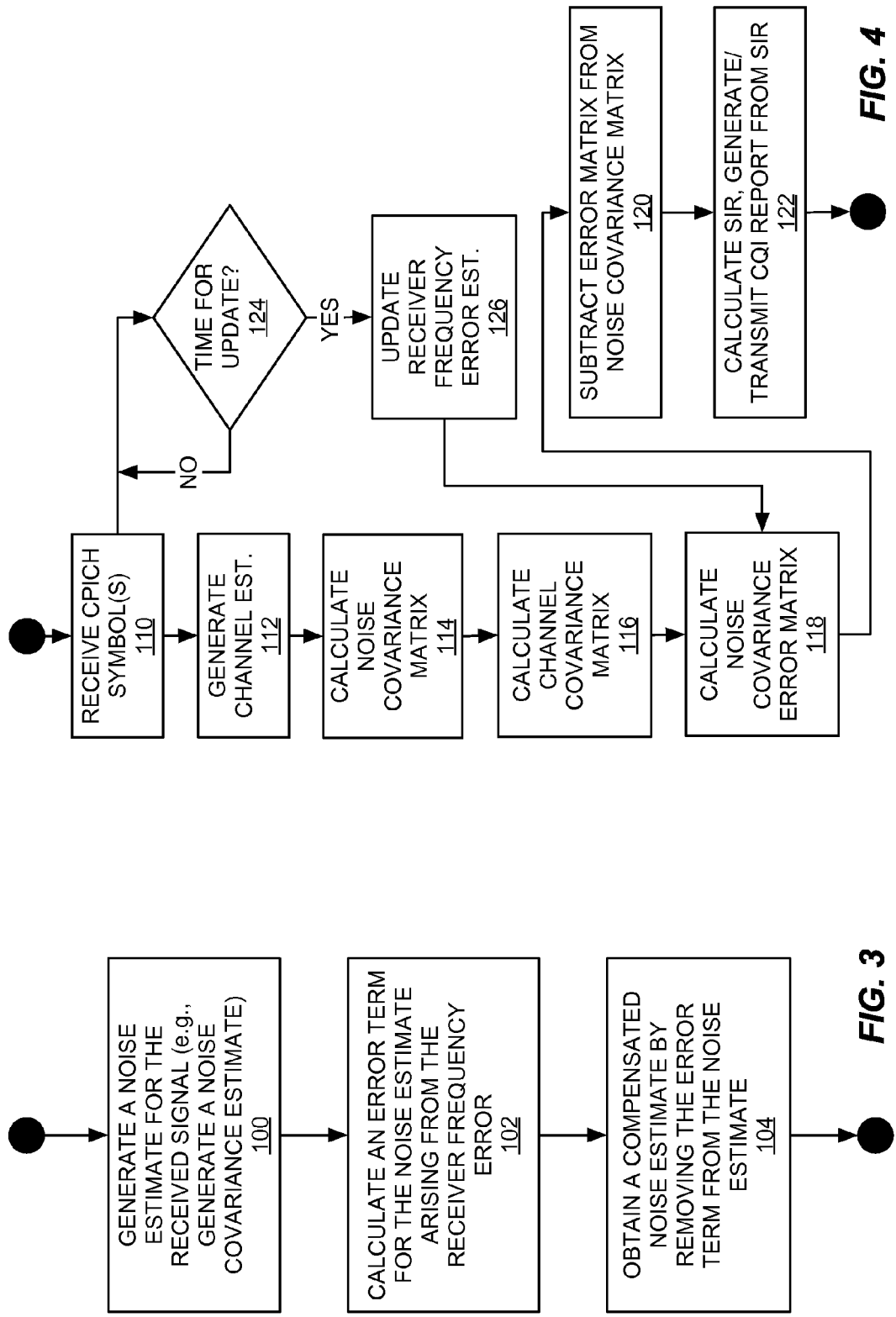

COMPENSATING FOR RECEIVER FREQUENCY ERROR IN NOISE ESTIMATION PROCESSING

RELATED APPLICATIONS

This is a continuation of U.S. patent application Ser. No. 10/991,878, filed 18 Nov. 2004, which is a U.S. application claiming priority to U.S. provisional application Ser. No. 60/580,202, filed 16 Jun. 2004.

TECHNICAL FIELD

The present application generally relates to wireless communication networks, and particularly relates to noise estimation processing in wireless communication receivers.

BACKGROUND

Noise estimation represents an integral part of receiver processing in wireless communication networks. For example, many types of modern wireless communication networks use "best-effort" packet data channels, where individual users are served at the highest data rates that can be supported given the prevailing radio and network conditions. Accurate noise estimation at the receivers is essential to the signal quality calculations performed at those receivers and, in turn, those signal quality calculations set the network's selection of serving data rates for the individual users.

If a wireless communication device operating on a best-effort channel reports an erroneously high received signal quality, the supporting network may select a serving data rate that is too high for reliable reception at the device. The built-in retransmission mechanisms, such as the use of Hybrid Automatic Repeat Requests (H-ARQ), commonly adopted for such best-effort channels exacerbate the problems associated with selecting serving data rate that is too high for reception conditions at the receiver, because the repeated retransmission of data packet erroneously received at the device lowers the effective data transmission rate. Indeed, with a high incidence of reception errors at the device, the effective data rate can be significantly lower than would be achieved by selecting a lower data rate more commensurate with the actual received signal quality at the device.

Conversely, if the device reports an erroneously low received signal quality, the network selects a lower data rate than actually could be supported, and the best-effort channel is underutilized with respect to that device. The underutilization can be severe, depending upon the particular data rate setting method adopted by the network. In W-CDMA systems, mobile stations engaged in high-rate packet data services with the network, e.g., High Speed Downlink Packet Access (HSDPA) services, provide received signal quality feedback to the network in the form of transmitted Channel Quality Indicators (CQI).

Basically, the CQI reports from a given mobile station correspond to the signal-to-interference ratio (SIR) as measured by the mobile station for a reference channel signal transmitted from the network sector serving the mobile station. The CQI values reported by the mobile stations are "mapped" into a table of available data rates, and a mobile station that is under-reporting signal quality is thus allocated a lower data rate than its conditions can support.

Receiver frequency error represents a primary source of noise estimation errors. For example, accurate noise estimation at the receiver depends on accurately processing a received reference signal, e.g., received pilot symbols. Any error between the receiver's frequency and the (network) transmitter's frequency gives rise to symbol de-rotation errors, which in turn, cause noise and channel estimation errors at the receiver. Ideally, then, a wireless communication receiver would directly compensate its noise estimation processing based on observed receiver frequency errors.

SUMMARY

The present invention comprises a method and apparatus for improved noise estimation in a wireless communication receiver. More particularly, the present invention provides for noise estimation processing that incorporates an error term based on an estimate of receiver frequency error, which may be a relatively small residual frequency error remaining after Automatic Frequency Correction (AFC) processing at the receiver. Thus, a receiver configured according to one or more embodiments of the present invention generates an uncompensated noise estimate and a corresponding error term based on the observed (residual) frequency error of the receiver, and uses them to obtain a compensated noise estimate from which the frequency error bias is at least partially removed. That compensated (unbiased) noise estimate may then be used to improve any number of receiver functions, such as in the generation of signal quality measurements having improved accuracy, or in the generation of noise and interference suppression filters having improved suppression performance.

In one or more embodiments, the present invention comprises a method of improving noise estimation processing in a wireless communication receiver based on generating an estimate of noise correlation for a received signal, calculating an error term corresponding to the noise correlation estimate arising from a receiver frequency error, and obtaining a compensated noise correlation estimate by removing the error term from the noise correlation estimate. Note that with a zero mean assumption, the noise correlation estimate is expressed as a noise covariance estimate, and it should be understood that use of the term "noise covariance" herein does not exclude the more general notion of computing noise correlations where a non-zero mean is considered.

With that point in mind, a receiver may use received pilot symbols for noise covariance estimation, or it may use any other type of reference signal transmitted by a supporting wireless communication network to enable channel and noise estimation processing at the receiver. In a W-CDMA wireless communication network, for example, the receiver of interest may be comprised in a wireless communication device, and the included receiver circuit may use Common Pilot Channel (CPICH) symbols for channel and noise estimation processing.

Regardless of the particular reference signal used, the receiver may use noise correlation estimates that are compensated for receiver frequency error as the basis for calculating received signal quality estimates having an improved accuracy. That is, the receiver improves its calculation of signal quality estimates by wholly or partially removing the effects of receiver frequency error bias. These improved signal quality estimates may be transmitted to an associated wireless communication network in the form of CQI reports, or some other form of signal quality report, for use by the network in setting the data rates at which data is transmitted to the receiver.

According to one or more embodiments of the above method of improved noise estimation, a receiver circuit generates an initial noise correlation estimate as an uncompensated noise covariance matrix that is based on a received reference channel signal and corresponding propagation channel estimates. For example, the receiver circuit may generate propagation channel estimates and an uncompensated noise covariance matrix based on processing one or more received pilot symbols. In any case, the receiver circuit calculates the error term as an error matrix that is based on an estimate of the receiver frequency error and a channel correlation matrix determined from the propagation channel estimates, which may be expressed in terms of covariance. The receiver frequency error may be determined by estimating the phase shift that occurs over a given number of pilot symbols, or by some other means. Regardless of the particular processing carried out for receiver frequency error estimation, the resulting error matrix may be removed from the uncompensated noise covariance matrix to obtain a compensated noise covariance matrix that can then be used for signal quality estimation, filtering, etc.

In carrying out the above noise estimation processing, the receiver circuit can be configured as hardware, software, or any combination thereof. As such, the present invention may be embodied in one or more integrated circuits, such as Application Specific Integrated Circuits (ASICs) or Field Programmable Gate Arrays (FPGAs), or in electronic design files for synthesizing the appropriate processing logic in such devices, or as stored program instructions for execution by a microprocessor, Digital Signal Processor (DSP), or other digital logic processor. Further, the receiver circuit may be implemented as part of, or in association with, additional receiver circuitry, including a RAKE-type receiver that provides one or more pilot channel despreaders (correlators) to obtain received pilot symbols and a channel estimation circuit to provide propagation channel estimates based on the despread pilot symbols.

Thus, in at least one embodiment of the receiver circuit, it includes a noise covariance estimation circuit configured to generate a noise covariance estimate for a received signal, and a compensation circuit configured to calculate an error term corresponding to the noise covariance estimate arising from a receiver frequency error and obtain a compensated noise covariance estimate by removing the error term from the noise covariance estimate. The receiver circuit may further include, or be associated with a signal quality estimation circuit configured to generate a signal quality estimate from the compensated noise covariance matrix, a frequency error estimation circuit configured to estimate the receiver frequency error used to calculate the error term, and with the aforementioned RAKE-type receiver and channel estimation circuits.

Of course, those skilled in the art will recognize that alternative circuit embodiments may be used, and that the above arrangement is given by way of non-limiting example. Indeed, the present invention is not limited by the above features and advantages, and those skilled in the art will recognize additional features and advantages upon reading the following detailed description, and upon viewing the accompanying figures.

BRIEF DESCRIPTION OF THE DRAWINGS

FIG. 1 is a block diagram of a wireless communication device in accordance with one or more embodiments of the present invention.

FIG. 2 is a block diagram of receiver details for the communication device of FIG. 1.

FIG. 3 is flow diagram of noise estimation processing logic in accordance with one or more embodiments of the present invention.

FIG. 4 is a flow diagram of processing logic details for one or more embodiments of the noise estimation processing outlined in FIG. 3.

DETAILED DESCRIPTION

FIG. 1 illustrates a wireless communication device 10 that is configured in accordance with one or more embodiments of the present invention. Device 10 may comprise essentially any type of wireless communication device or system, and thus may comprise a mobile station, a Portable Digital Assistant (PDA), a pager, a laptop/palmtop computer, etc. In at least one embodiment, the wireless communication device 10 comprises a mobile station configured for operation in a cellular communication network. In at least one embodiment, the wireless communication device 10 comprises a mobile station configured for operation in a Wideband CDMA (W-CDMA) communication network.

Thus, with the understanding that device 10 is not limited by the disclosed illustrations, FIG. 1 depicts an arrangement wherein device 10 is adapted for wireless communication and comprises a receiver 12 to receive and process received signals, a transmitter 14 to generate and transmit signals, one or more antennas 16 coupled to receiver 12 and transmitter 14 via a switch/duplexer 18, a system controller 20 to support receive/transmit operations, and to support user interface (UI) 22, which may include a display, keypad, audio input/output transducers, etc.

Turning to receiver details for one or more embodiments of device 10, FIG. 2 partially illustrates the included receiver 12. In the illustrated embodiment, receiver 12 includes a radiofrequency (RF) front-end circuit 30, a RAKE-type receiver 32, a receiver circuit 34 that is configured for noise estimation processing in accordance with the present invention, and which may include, or be associated with, a signal quality estimation circuit 36, and an Automatic Frequency Control (AFC) circuit 38. In at least one embodiment of receiver circuit 34, which is of particular interest in the context of the present invention, it includes a noise covariance estimation circuit 40 configured to generate a noise estimate for the received signal, and a compensation circuit 42 configured to compensate the noise estimate for the receiver's frequency error. Such error generally is measured with respect to the transmitter frequency of the network transmitter originating the received signal.

The compensated noise estimate may be used by signal quality estimation circuit 36 to generate signal quality measurements having improved accuracy, i.e., having the receiver frequency error bias removed or at least reduced, and/or may be used to improve operation of RAKE receiver 32. For example, some embodiments of RAKE receiver 32 may incorporate the present invention's compensated noise correlation estimates into RAKE combining weight generation to provide improved interference and noise suppression. That is, a combining weight generator, whether included in receiver circuit 34, or RAKE receiver 32, may be configured to generate RAKE combining weights using the compensated noise correlation estimates, such that the combining weight generation is improved by reducing the effects on receiver frequency error.

RAKE receiver 32 can be associated with a receiver RF front-end circuit 30, which includes amplifiers, mixers, filters, and analog-to-digital converters (ADCs) as needed or desired. Front-end circuit 30 can be configured to provide the RAKE receiver 32 with one or more sampled signals r' (e.g., I/Q sample streams) corresponding to the received signal r(t). Searcher 50 identifies one or more multipath components of the received signal arising from the time dispersive nature of multipath propagation, and delay estimator 52 generates corresponding delay estimates. In turn, pilot channel correlator(s) 54, channel estimator 56, and traffic correlator(s) 58, use those delay estimates to despread pilot and traffic symbols, and to make propagation channel estimates.

More particularly, in Direct Sequence CDMA embodiments of receiver 12, pilot channel correlator(s) 54 are time-aligned to one or more multipath rays of the received signal, and use a corresponding despreading code (e.g., Walsh code) to despread pilot symbols contained in the received signal, and channel estimator 56 uses the despread pilot symbols, which may be Common Pilot Channel (CPICH) symbols such as used in W-CDMA systems, to generate propagation channel estimates for the received signal. Those propagation channel estimates are used to compensate the despread traffic channel symbols obtained from traffic correlators 58 for propagation channel phase and attenuation characteristics. RAKE combiner 60 generally improves the signal-to-noise ratio (SNR) of the received signal by combining the despread traffic symbols from each of one or more multipath rays of the received signal in RAKE combiner 60. The RAKE-combined signal output by combiner 60 is then provided to a decoder and/or other processing circuits in the receiver's signal processing chain.

In looking at noise estimation processing with respect to the receiver circuit 34, FIG. 3 illustrates processing details for one or more embodiments of the present invention, wherein receiver circuit 34 generates an initial noise correlation estimate for the received signal (Step 100). For zero mean, the noise correlation estimate is expressed as a noise covariance estimate. It should be understood that the present invention contemplates a configuration of receiver circuit 34 wherein its noise estimations generally are based on performing noise covariance calculations, but the more general noise correlation processing with non-zero may be implemented as needed or desired.

Regardless, processing continues with the calculation of an error term for the initial noise estimate, wherein the error term corresponds to a receiver frequency error (Step 102). In turn, the error term is used to obtain a compensated noise estimate (Step 104). More particularly, the initial uncompensated noise estimate, which is biased by receiver frequency error, is made into an unbiased estimate by compensating it for the receiver frequency error. In at least one embodiment of the present invention, the bias in the initial noise estimate arising from the receiver frequency error is removed to obtain an unbiased noise estimate by subtracting the error term from the initial (biased) noise estimate. It should be understood that such operations are based on scalar operations where the noise estimate is a scalar value, vector operations where the noise estimate is a vector value, and matrix operations where the noise estimate is a matrix value.

With the broad processing of FIG. 3 in mind, FIG. 4 illustrates noise estimation processing details for a given noise estimation interval. It should be understood that receiver 12 generally maintains updated noise estimations, which are used for periodically measuring and reporting signal quality to a supporting wireless communication network. In W-CDMA embodiments of device 10, the update interval is typically at least as short as 2 ms (500 Hz), which is the defined reporting interval for mobile station CQI reports that are returned to the network by devices engaged in high-rate packet data services on the HSDPA channel.

In support of noise estimation processing, receiver 12 receives and despreads pilot symbols (or any other type of suitable reference signal information), and generates propagation channel estimates from them (Steps 110 and 112). Let y(k) be a vector of despread pilot signal samples from all fingers in a RAKE receiver during the kth symbol period:

$$y(k)=s(k)h(k)m(k)+n(k), \quad (1)$$

where s(k) denotes the kth transmitted reference symbol, h(k) denotes the true channel response at time k, m(k) is a multiplicative impairment, and n(k) is additive noise. For simplicity, but without loss of generality, s(k) can be set constant to "1" herein. When the receiver is subject to a residual frequency error, the multiplicative impairment can be expressed as $$m(k)=e^{i2\pi v k}, \quad (2)$$

where V is a per reference symbol phase change corresponding to a residual receiver frequency error expressed as $\Delta f$. Note that with this method, the receiver frequency error can be determined over a defined duration of reference (pilot) symbols.

As for the per reference symbol phase change, it holds that $$v=\Delta f \cdot T_{pilot}, \quad (3)$$

where $T_{pilot}$ is the duration of one reference symbol. In a W-CDMA embodiment, a CPICH reference symbol can be used, which would give $T_{pilot}=1/15000$ s. By way of non-limiting example, receiver 12 may then be configured to generate channel estimates as, $$\hat{h} = \frac{1}{N}\sum_{k=0}^{N-1} y(k), \quad (4)$$

where $\hat{h}$ is the estimated channel response corresponding to the true channel response h, taken as an average over N reference symbols, e.g., CPICH symbols.

Using the channel estimates generated above, an estimate of the noise term at time k can be calculated as $$\hat{n}(k)=y(k)-\hat{h}. \quad (5)$$

With the above noise formulation, receiver circuit 34 can be configured to calculate an initial noise covariance estimate (Step 114), $\hat{R}_0$, as $$\hat{R}_0 = \frac{1}{N-1}\sum_{k=0}^{N-1} \hat{n}(k)\hat{n}^H(k). \quad (6)$$

The above noise estimate is an unbiased estimate in the absence of receiver frequency error, but includes a frequency-related bias error to the extent that the receiver's operating frequency mismatches the remote transmitter's frequency. AFC circuit 38 is configured to correct gross receiver frequency errors on an ongoing basis, but such corrections nonetheless leave non-zero residual frequency errors that contribute to noise estimation errors if not compensated for in noise estimation processing. As mentioned earlier herein, such errors can be significant because they cause device 10 to report a lower-than-actual received signal quality to a supporting wireless network, which causes the network to serve device 10 at a lower data rate than is appropriate for the actual received signal quality at device 10.

In the presence of receiver frequency error $\Delta f$, de-rotation of the reference symbols used in the channel and noise estimation processes suffer from error in proportion to the frequency error of receiver 12. In particular, the channel estimates generated in Eq. (4) can be expressed as $$\hat{h} = \frac{1}{N}\sum_{k=0}^{N-1} y(k) = \frac{1}{N}\frac{1-e^{i2\pi vN}}{1-e^{i2\pi v}} \cdot h + \frac{1}{N}\sum_{k=0}^{N-1} n(k), \quad (7a)$$

and the estimate of the noise term in Eq. (5) can be expressed as $$\hat{n}(k) = y(k) - \hat{h} = \left(e^{i2\pi vk} - \frac{1}{N}\frac{1-e^{i2\pi vN}}{1-e^{i2\pi v}}\right) \cdot h + n(k) - \frac{1}{N}\sum_{l=0}^{N-1} n(l). \quad (7b)$$

With the above expressions in mind, an error term corresponding to receiver frequency error can be expressed as $$\Delta R = \frac{1}{N-1}\left(N - \frac{1}{N}\frac{1-\cos(2\pi vN)}{1-\cos(2\pi v)}\right)hh^H, \quad (8)$$

which can be implemented using the estimated channel response, i.e., using the propagation channel estimates $\hat{h}$, and thus expressed as, $$\Delta R \approx \left(\frac{N(N+1)}{3}\pi^2 v^2\right)\hat{h}\hat{h}^H, \quad (9)$$

where the first term in a Taylor series expansion has been used. Higher order terms also may be included, but they are negligible for moderate frequency errors. In error matrix form, the error term $\Delta R$ can be expressed as a function of the observed phase change v, and the estimated channel covariance matrix given by $\hat{h}\hat{h}^H$. In the context of FIG. 4, then, processing continues with the calculation of the channel covariance matrix (Step 116) and the error matrix (Step 118).

In selecting values for the above equation in the context of W-CDMA embodiments of device 10, v may be expressed as $\Delta f/15000$, where 15000 CPICH symbols are received per second, and where $\Delta f$ is the residual receiver frequency error in Hz. Referring to FIG. 2, one sees that AFC circuit 38 may provide receiver circuit 34 with an indication of the residual frequency error as $\Delta f$, or pre-computed as v. In either instance, the indication may be provided as a periodically updated digital value for use by compensation circuit 42.

Regardless of variations in the implementation details, the present invention compensates for receiver frequency errors in its noise estimation processing by directly considering the above equation. More particularly, the present invention obtains a compensated noise estimate by removing a frequency-related error term from its initial noise estimate. Set in the context provided by the above equations, the receiver circuit 34 generates a noise covariance matrix $\hat{R}_0$ that includes a receiver frequency error bias, generates an error matrix $\Delta R$ that is proportional to that frequency error, and obtains a compensated noise covariance matrix $\hat{R}_{unbiased}$ based on removing the error matrix from the biased estimate. As such, the compensated estimate (in Step 120) may be obtained as, $$\hat{R}_{unbiased} = \hat{R}_0 - \Delta R = \hat{R}_0 - \left(\frac{N(N+1)}{3}\pi^2 v^2\right)\hat{h}\hat{h}^H. \quad (10)$$

Thus, in at least one embodiment of the present invention, the compensated (unbiased) noise estimates are used for improved signal quality estimation, e.g., signal quality estimation circuitry uses the compensated noise estimates to calculate more accurate signal quality estimates (Step 122). Thus, the compensated noise covariance matrix, $\hat{R}_{unbiased}$, may be used by estimation circuit 36 to obtain an improved SIR estimate for the received signal, and thus to obtain an improved CQI value for reporting by device 10 to the supporting wireless network. Note that steps 110 through 122 thus may be carried out according to the desired SIR/CQI reporting interval. However, it should be understood that the present invention contemplates additional or alternative uses, such as the use of compensated noise estimates by RAKE receiver 32 to generate improved RAKE combining weights for noise suppression with respect to received traffic channel symbols.

In supporting signal quality reporting, AFC circuit 38 and/or compensation circuit 42 of receiver circuit 34 may periodically update the residual frequency error estimate, v (Steps 124 and 126), every N CPICH symbols, or may maintain a running average of v updated as CPICH symbols are received and despread. In either case, such processing may run concurrently with the noise estimation processing such that updated frequency error information is available as needed for compensating ongoing noise estimation processing.

With dynamically updated unbiased noise estimates thus available according to a defined update interval, one may take advantage of filtering to smooth the unbiased estimates, and thus obtain what, in some cases, may be a more suitable unbiased noise estimate. The desirability of filtering the unbiased noise estimates and the degree of filtering applied may vary depending on the performance needs of device 10, and on the computational resources and demands attendant thereto. In any case, a filter may be implemented in receiver circuit 34 such that it outputs a filtered version of its unbiased noise estimates. This may be computed for example as, $$\hat{R}_{filt} = \alpha \hat{R}_{filt} + (1-\alpha)\hat{R}_{biased}, \quad (11)$$

where $\alpha$ may be adjusted to control the filter response. For example, where $0 \le \alpha < 1$, then a setting close to 1 imposes heavier filtering and a setting at or close to 0 imposes lighter filtering.

In any case, SIR estimation in one or more embodiments of the present invention may be carried out by signal quality estimation circuit 36 according to, $$SINR = \hat{h}^H \hat{R}_{unbiased}^{-1} \hat{h}, \quad (12)$$

for a "Generalized" RAKE receiver embodiment that uses noise suppression/whitening in its RAKE combining weight generation. Where RAKE receiver 32 is configured for consideration of noise powers only, one may obtain a Signal-to-Noise-plus-Interference Ratio (SINR) by taking the diagonals of the unbiased noise covariance matrix thusly, $$SINR = \sum_i \frac{|h(i)|^2}{\hat{r}_{unbiased}(i,i)}, \quad (13)$$

where $\hat{r}_{unbiased}(i,i)$ is the ith diagonal element of $\hat{R}_{unbiased}$. Finally, if RAKE receiver 32 does not incorporate noise statistics into its combining weight generation, then the SINR for the received signal is given as, $$SINR = \frac{h^H h}{\sigma_I^2}, \quad (14)$$

where $\sigma_i^2$ can be computed as, $$\sigma_I^2 = \frac{1}{J} \sum_{i=0}^{J-1} \hat{r}_{unbiased}(i, i), \quad (15)$$

where J denotes the total number of RAKE fingers.

With any of the above SINR computations, a corresponding CQI may be generated based on indexing a SINR-to-CQI lookup table, or based on making a SINR-to-CQI calculation. For more information, refer to the co-pending U.S. application Ser. No. 10/869,527, filed on 16 Jun. 2004, and which is incorporated herein by reference. Note, too, that the filtered version of the unbiased noise estimates may be used in any of the above signal quality calculations.

Those skilled in the art should appreciate that the particular method(s) adopted for channel estimation, noise covariance estimation, signal quality estimation, and CQI reporting, if implemented, may be varied as needed or desired without departing from the scope of the present invention. Those skilled in the art will appreciate that should other methods be used, the expression for the covariance matrix error term may change correspondingly, but the methods disclosed herein remain valid with such changes. Indeed, the present invention is not limited by the foregoing discussion and accompanying illustrations, but rather is limited only by the following claims and their reasonable equivalents.

What is claimed is:

1. A method of improving noise estimation processing in a wireless communication receiver, the method comprising:
generating an estimated noise correlation matrix for a received signal, based on a propagation channel estimate vector corresponding to a plurality of correlator delays;
calculating an error matrix that represents an estimate of that portion of the estimated noise correlation matrix that arises from a receiver frequency error; and
obtaining a compensated noise correlation estimate by removing the error matrix from the estimated noise correlation matrix.

2. The method of claim 1, further comprising calculating a signal-to-interference ratio based on the compensated noise correlation estimate.

3. The method of claim 2, further comprising determining a Channel Quality Indicator from the signal-to-interference ratio for transmission to a supporting wireless communication network.

4. The method of claim 1, further comprising determining RAKE combining weights for a RAKE receiver circuit included in the wireless communication receiver based on the compensated noise correlation estimate.

5. The method of claim 1, further comprising determining signal quality estimates for the received signal based on the compensated noise correlation estimate.

6. The method of claim 1, wherein generating the estimated noise correlation matrix for a received signal comprises generating an initial noise correlation matrix based on a received reference channel signal and corresponding propagation channel estimates.

7. The method of claim 6, wherein calculating the error matrix comprises calculating the error matrix based on an estimate of the receiver frequency error and a channel correlation matrix determined from the propagation channel estimates.

8. The method of claim 7, wherein obtaining the compensated noise correlation estimate by removing the error matrix from the estimated noise correlation matrix comprises subtracting the error matrix from the initial noise correlation matrix to obtain a compensated noise correlation matrix.

9. The method of claim 1, wherein generating the estimated noise correlation matrix comprises generating an initial noise covariance matrix based on a received reference channel signal and corresponding propagation channel estimates generated from the received reference channel signal.

10. The method of claim 9, wherein the reference channel signal is a pilot channel signal, and wherein the propagation channel estimates are generated from received pilot symbols.

11. The method of claim 10, wherein calculating the error matrix comprises calculating the error matrix based on determining an estimate of the receiver frequency error over a defined interval of pilot symbols, and wherein obtaining the compensated noise correlation estimate comprises subtracting the error matrix from the initial noise covariance matrix to obtain a compensated noise covariance matrix.

12. A wireless communication device comprising a receiver circuit configured to:
generate an estimated noise correlation matrix for a received signal, based on a propagation channel estimate vector corresponding to a plurality of correlator delays;
calculate an error matrix that represents that portion of the estimated noise correlation matrix that arises from a receiver frequency error; and
obtain a compensated noise correlation estimate by removing the error matrix from the estimated noise correlation matrix.

13. The device of claim 12, wherein the receiver circuit includes a signal quality estimation circuit configured to estimate a signal quality for the received signal based on the compensated noise correlation estimate.

14. The device of claim 13, wherein the signal quality estimation circuit is configured to calculate a signal-to-interference ratio based on the compensated noise correlation estimate, such that the calculated signal-to-interference ratio is compensated for the receiver frequency error.

15. The device of claim 14, wherein the signal quality estimation circuit is configured to determine a Channel Quality Indicator value from the calculated signal-to-interference ratio, such that the Channel Quality Indictor value is compensated for the receiver frequency error.

16. The device of claim 12, wherein the receiver circuit includes or is associated with a frequency error estimation circuit configured to estimate the receiver frequency error used to calculate the error matrix.

17. The device of claim 16, wherein the frequency error estimation circuit is configured to estimate the receiver frequency error based on determining a symbol phase change over a defined interval of pilot symbols in a pilot signal received in association with the received signal.

18. The device of claim 12, further comprising a RAKE receiver operatively associated with the receiver circuit, said RAKE receiver configured to calculate RAKE combining weights based on the compensated noise correlation estimate, such that the RAKE combining weights are compensated for the receiver frequency error.

19. The device of claim 12, wherein the receiver circuit includes a noise correlation estimation circuit configured to generate the estimated noise correlation matrix, and a compensation circuit configured to calculate the error matrix and to obtain the compensated noise correlation estimate.

20. The device of claim 19, wherein the noise correlation estimation circuit is configured to generate the estimated noise correlation matrix as an initial noise covariance matrix, and wherein the compensation circuit is configured to calculate the error matrix based on the receiver frequency error, and to obtain the compensated noise correlation estimate as a compensated noise covariance matrix by subtracting the error matrix from the initial noise covariance matrix.

21. The device of claim 12, wherein the receiver circuit includes or is associated with a RAKE-type receiver configured to despread a received reference channel signal to obtain reference symbols, and a channel estimation circuit configured to generation propagation channel estimates from the reference symbols, and wherein the estimated noise correlation matrix comprises a noise covariance matrix generated from the reference symbols and the corresponding propagation channel estimates.

22. The device of claim 12, wherein the receiver circuit is configured to generate the estimated noise correlation matrix as a noise covariance matrix, and to obtain the compensated noise correlation estimate as a compensated noise covariance matrix based on subtracting an error matrix from the noise correlation matrix, wherein the error matrix is based on the receiver frequency error.

23. The device of claim 12, wherein the device comprises a mobile station configured for operation in a cellular communication network, and wherein the mobile station is configured periodically to obtain compensated noise correlation estimates, and to generate and transmit Channel Quality Indicator reports to the cellular communication network based on the compensated noise correlation estimates.

24. The device of claim 12, wherein the device comprises a Wideband Code Division Multiple Access mobile station configured for operation in a Wideband Code Division Multiple Access wireless communication network.

25. A non-transitory computer readable medium storing a computer program for a wireless communication device comprising:
program instructions to generate an estimated noise correlation matrix for a received signal, based on a propagation channel estimate vector corresponding to a plurality of correlator delays;
program instructions to calculate an error matrix representing that portion of the estimated noise correlation matrix that arises from a receiver frequency error; and
program instructions to obtain a compensated noise correlation estimate by removing the error matrix from the estimated noise correlation matrix.

26. The computer readable medium of claim 25, wherein the computer program comprises program instructions to generate a signal quality estimate from the compensated noise correlation estimate.

27. The computer readable medium of claim 26, wherein the computer program comprises program instructions to estimate the receiver frequency error used to calculate the error matrix based on observing symbol phase changes over a defined interval of reference channel symbols received in conjunction with the received signal.

28. The computer readable medium of claim 25, wherein the computer program comprises program instructions to generate propagation channel estimates based on despread reference symbols obtained from a received reference signal, and wherein the program instructions to generate the estimated noise correlation matrix comprise program instructions to generate a noise correlation matrix from the reference symbols and the corresponding propagation channel estimates.

29. The computer readable medium of claim 25, wherein the program instructions to generate the estimated noise correlation matrix comprises program instructions to generate a noise correlation matrix based on a received reference channel signal and corresponding propagation channel estimates.

30. The computer readable medium of claim 29, wherein the program instructions to calculate the error matrix comprise program instructions to calculate the error matrix based on an estimate of the receiver frequency error and a channel correlation matrix determined from the propagation channel estimates.

31. The computer readable medium of claim 30, wherein the program instructions to obtain the compensated noise correlation estimate comprise program instructions to obtain a compensated noise correlation matrix by subtracting the error matrix from the noise correlation matrix.

32. The computer readable medium of claim 25, wherein the program instructions to generate the estimated noise correlation matrix for a received signal comprise program instructions to generate an initial noise covariance matrix having an error component arising from the receiver frequency error, and wherein the program instructions to obtain a compensated noise correlation estimate by removing the error matrix from the estimated noise correlation matrix comprise program instructions to subtract the error matrix from the initial noise covariance matrix to obtain a compensated noise covariance matrix.

33. The computer readable medium of claim 32, wherein the program instructions to calculate the error matrix comprises program instructions to compute an error matrix based on determining a pilot symbol phase change over a defined interval of pilot symbols received in association with the received signal.

34. The computer readable medium of claim 32, further comprising program instructions to compute a signal quality estimate for the received signal based on the compensated noise covariance matrix.

35. The computer readable medium of claim 32, further comprising program instructions to compute RAKE combining weights for RAKE receiver processing of the received signal based on the compensated noise covariance matrix.

* * * * *

UNITED STATES PATENT AND TRADEMARK OFFICE
CERTIFICATE OF CORRECTION

PATENT NO. : 8,934,521 B2  Page 1 of 1
APPLICATION NO. : 13/927199
DATED : January 13, 2015
INVENTOR(S) : Wallén It is certified that error appears in the above-identified patent and that said Letters Patent is hereby corrected as shown below:

In The Specification

In Column 8, Line 44, in Equation (11), delete " $\hat{R}_{filt} = \alpha \hat{R}_{filt} + (1-\alpha) \hat{R}_{biased}$, "

and insert -- $\hat{R}_{filt} = \alpha \hat{R}_{filt} + (1-\alpha) \hat{R}_{unbiased}$, --, therefor.

Signed and Sealed this
Twenty-seventh Day of October, 2015

Michelle K. Lee
*Director of the United States Patent and Trademark Office*